US009235947B2

(12) United States Patent
Mirumachi et al.

(10) Patent No.: US 9,235,947 B2
(45) Date of Patent: Jan. 12, 2016

(54) SUBJECT DISCRIMINATING APPARATUS AND COIN DISCRIMINATING APPARATUS

(75) Inventors: Naofumi Mirumachi, Saitama (JP); Masataka Takahashi, Matsudo (JP)

(73) Assignee: LAUREL PRECISION MACHINES CO., LTD., Osaka-shi, Osaka (JP)

( * ) Notice: Subject to any disclaimer, the term of this patent is extended or adjusted under 35 U.S.C. 154(b) by 551 days.

(21) Appl. No.: 13/432,364

(22) Filed: Mar. 28, 2012

(65) Prior Publication Data

US 2012/0249780 A1 Oct. 4, 2012

(30) Foreign Application Priority Data

Mar. 30, 2011 (JP) ............................... P2011-076341

(51) Int. Cl.
*H04N 5/76* (2006.01)
*G07D 5/00* (2006.01)

(52) U.S. Cl.
CPC ...................................... *G07D 5/005* (2013.01)

(58) Field of Classification Search
CPC ..................... G06T 2207/30164; G06T 7/001; G06T 2207/20016; G01N 21/95692; G01N 23/04; G02F 2001/133354; G06F 19/321; G06F 19/3406; G06F 19/3437; H04N 5/2253; H04N 5/23293; G07D 5/005
USPC .................................................. 348/125–132
See application file for complete search history.

(56) References Cited

U.S. PATENT DOCUMENTS 5,220,614 A 6/1993 Crain
5,367,577 A 11/1994 Gotaas
5,538,123 A * 7/1996 Tsuji ............................. 194/303
5,915,518 A 6/1999 Hopwood et al.
6,484,865 B1 * 11/2002 Hibari et al. .................. 194/330
2002/0037096 A1 * 3/2002 Sugata .......................... 382/136

(Continued)

FOREIGN PATENT DOCUMENTS

CN 1284691 A 2/2001
CN 1495677 A 5/2004

(Continued)

OTHER PUBLICATIONS

Taiwanese Official Action and English translation in TW 101110896 dated Apr. 16, 2014.

(Continued)

*Primary Examiner* — Mohammed Rahaman
(74) *Attorney, Agent, or Firm* — Nixon & Vanderhye P.C.

(57) ABSTRACT

A subject discriminating apparatus discriminates a subject having an unevenness pattern on a surface of the subject. The subject discriminating apparatus includes: a transparent unit including a supporting surface supporting the subject; a light irradiation unit irradiating illumination light onto the surface of the subject through the transparent unit; an imaging unit imaging an imaging region including at least a part of the transparent unit, and generating image data; and a discrimination processing unit discriminating the subject, using the image data generated by the imaging unit. The discrimination processing unit discriminates the subject based on discrimination image data generated by correcting subject image data using correction image data. The subject image data is generated by imaging the imaging region in a state of the subject presenting in the imaging region. The correction image data is generated by imaging the imaging region free from the subject in the imaging region.

8 Claims, 10 Drawing Sheets

(56) References Cited

U.S. PATENT DOCUMENTS

| | | | | |
|---|---|---|---|---|
| 2004/0108183 | A1* | 6/2004 | Sugata et al. | 194/328 |
| 2004/0120567 | A1* | 6/2004 | Takahashi | 382/136 |
| 2004/0129528 | A1* | 7/2004 | Takebayashi | 194/328 |
| 2007/0058772 | A1* | 3/2007 | Schutz | 378/4 |
| 2009/0022390 | A1 | 1/2009 | Yacoubian et al. | |
| 2010/0029374 | A1* | 2/2010 | Obi et al. | 463/25 |
| 2012/0301009 | A1* | 11/2012 | Dabic | 382/136 |

FOREIGN PATENT DOCUMENTS

| | | | |
|---|---|---|---|
| CN | 101789146 | A | 7/2010 |
| JP | 09-297834 | | 11/1997 |
| JP | 10-105765 | | 4/1998 |
| JP | 2000-076512 | | 3/2000 |
| JP | 2000-163624 | | 6/2000 |
| JP | 2000-306135 | | 11/2000 |
| JP | A-2001-034804 | | 2/2001 |
| JP | 2001-126102 | | 5/2001 |
| JP | A-2001-175912 | | 6/2001 |
| JP | A-2006-268484 | | 10/2006 |
| JP | 2008-257395 | | 10/2008 |
| TW | 200426717 | A | 12/2004 |
| WO | WO 91/03031 | A1 | 3/1991 |
| WO | WO 95/19019 | A2 | 7/1995 |
| WO | WO 2012/036956 | A1 | 3/2012 |

OTHER PUBLICATIONS

EP Search Report in EP 12 16 1449 dated Jul. 13, 2012.

CN Office Action and English translation in CN 201210085787.7 mailed Feb. 7, 2014.

Korean Notice of Allowance and brief English translation in KR 10-2012-0031967 mailed Apr. 4, 2014.

Korean Office Action and English translation in KR 10-2012-0031967 dated Jun. 19, 2013.

Office Action and English translation in JP 2011-076341 dated Jul. 1, 2014.

* cited by examiner

SUBJECT DISCRIMINATING APPARATUS AND COIN DISCRIMINATING APPARATUS

BACKGROUND OF THE INVENTION

1. Field of the Invention

The present invention relates to a subject discriminating apparatus that discriminates a subject having an unevenness pattern on its surface, and a coin discriminating apparatus.

Priority is claimed on Japanese Patent Application No. 2011-076341, filed Mar. 30, 2011, the content of which is incorporated herein by reference.

2. Description of Related Art

As subject discriminating apparatuses that discriminate a subject having an unevenness pattern on its surface, coin discriminating apparatuses, which image a coin and discriminate the coin based on the acquired image data, are known. Such coin discriminating apparatuses generally carry a plurality of coins and sequentially image the surfaces of the coins that are carried to an imaging region. Coin discriminating apparatuses includes, for the imaging, a light source which irradiates an illumination light on the coin surface, and an imaging unit which receives the reflected light that is reflected from the coin surface (for example, refer to Japanese Unexamined Patent Application, First Publication No. 2000-306135 (hereunder referred to as Patent Document 1)).

In the coin discriminating apparatus disclosed in Patent Document 1, the coin is carried while being pressed against the surface of a transparent member by a carrying belt. The transparent member is composed of a light-transmissive material such as glass. The light source is arranged on the lower side of the transparent member, performing light emission in a timing at which the coin passes through the imaging region, and irradiates the illumination light onto the coin surface via the transparent member. The imaging unit is arranged such that it is directly facing the coin surface, and receives, among the illumination light, mainly the reflected light reflected from the coin surface. The discrimination of the coin is performed by comparing the image data acquired by the imaging unit, with pre-recorded data which represents the types of coins.

However, in the coin discriminating apparatus disclosed in Patent Document 1, in addition to the reflected light from the coin surface, reflected light that is reflected at the surface of the transparent member on the side in which the coin is carried, and reflected light that is reflected at the surface of the transparent member on the side in which the illumination light is irradiated, are also incident on the imaging unit. Consequently, an accurate discrimination using the acquired image data can no longer be performed, causing a decline in the discrimination accuracy. Furthermore, the images created based on this image data are displayed such that the periphery of the coin is whitishly blurred as a result of the reflected light from the transparent member surfaces being imaged, making visual recognition more difficult.

DETAILED DESCRIPTION OF THE INVENTION

An object of the present invention is to provide a subject discriminating apparatus and a coin discriminating apparatus which have excellent discrimination accuracy.

A subject discriminating apparatus according to the present invention discriminates a subject having an unevenness pattern on a surface of the subject. The subject discriminating apparatus includes: a transparent unit that includes a supporting surface supporting the subject; a light irradiation unit that irradiates illumination light onto the surface of the subject through the transparent unit; an imaging unit that images an imaging region including at least a part of the transparent unit, and generates image data; and a discrimination processing unit that discriminates the subject, using the image data generated by the imaging unit. The discrimination processing unit discriminates the subject based on discrimination image data generated by correcting subject image data using correction image data. The subject image data is generated by imaging the imaging region in a state of the subject presenting in the imaging region. The correction image data is generated by imaging the imaging region free from the subject in the imaging region.

The subject discriminating apparatus may further include: a storage unit that stores the correction image data. The discrimination processing unit may generate the discrimination image data by correcting the subject image data generated by the imaging unit, using the correction image data stored in the storage unit.

In the subject discriminating apparatus, the discrimination processing unit may stores the correction image data in the storage unit at a time of manufacturing the subject discriminating apparatus.

In the subject discriminating apparatus, the discrimination processing unit may store the correction image data in the storage unit at a time of a maintenance mode of the subject discriminating apparatus.

In the subject discriminating apparatus, the discrimination processing unit may generate the discrimination image data by subtracting the correction image data from the subject image data.

The subject discriminating apparatus may further include a carrier unit that carries the subject. The support surface of the transparent unit may constitute a part of the carrier unit. The transparent unit may include an antireflective film on a surface on an opposite side to the support surface.

In the subject discriminating apparatus, the carrier unit may include a guide groove that guides conveyance of the subject.

A coin discriminating apparatus according to the present invention discriminates a coin having an unevenness pattern on a surface of the coin. The coin discriminating apparatus includes: a transparent unit that includes a supporting surface supporting the coin; a light irradiation unit that irradiates illumination light onto the surface of the coin through the transparent unit; an imaging unit that images an imaging region including at least a part of the transparent unit, and generates image data; and a discrimination processing unit that discriminates the coin, using the image data generated by the imaging unit. The discrimination processing unit discriminates the coin based on discrimination image data generated by correcting subject image data using correction image data. The subject image data is generated by imaging the imaging region in a state of the coin presenting in the imaging region. The correction image data is generated by imaging the imaging region free from the coin in the imaging region.

According to the present invention, by means of the correction image data, the level of reflected light that is reflected solely from the supporting surface of the transparent unit in which the subject is not present, can be obtained. Further, by correcting the subject image data by using this correction image data, in effect, discrimination image data produced based on the reflected light that is reflected solely from the subject, which excludes the reflected light that is reflected by the supporting surface of the transparent unit, can be obtained. Based on this discrimination image data, the discrimination of a subject can be performed with excellent accuracy. Therefore, a subject discriminating apparatus and a coin discriminating apparatus which have excellent discrimination accuracy can be provided.

DETAILED DESCRIPTION OF THE INVENTION

Hereunder, a coin discriminating apparatus according to an embodiment of the present invention, which performs discrimination of a coin having an unevenness pattern on its surface, is described.

Figure 1:
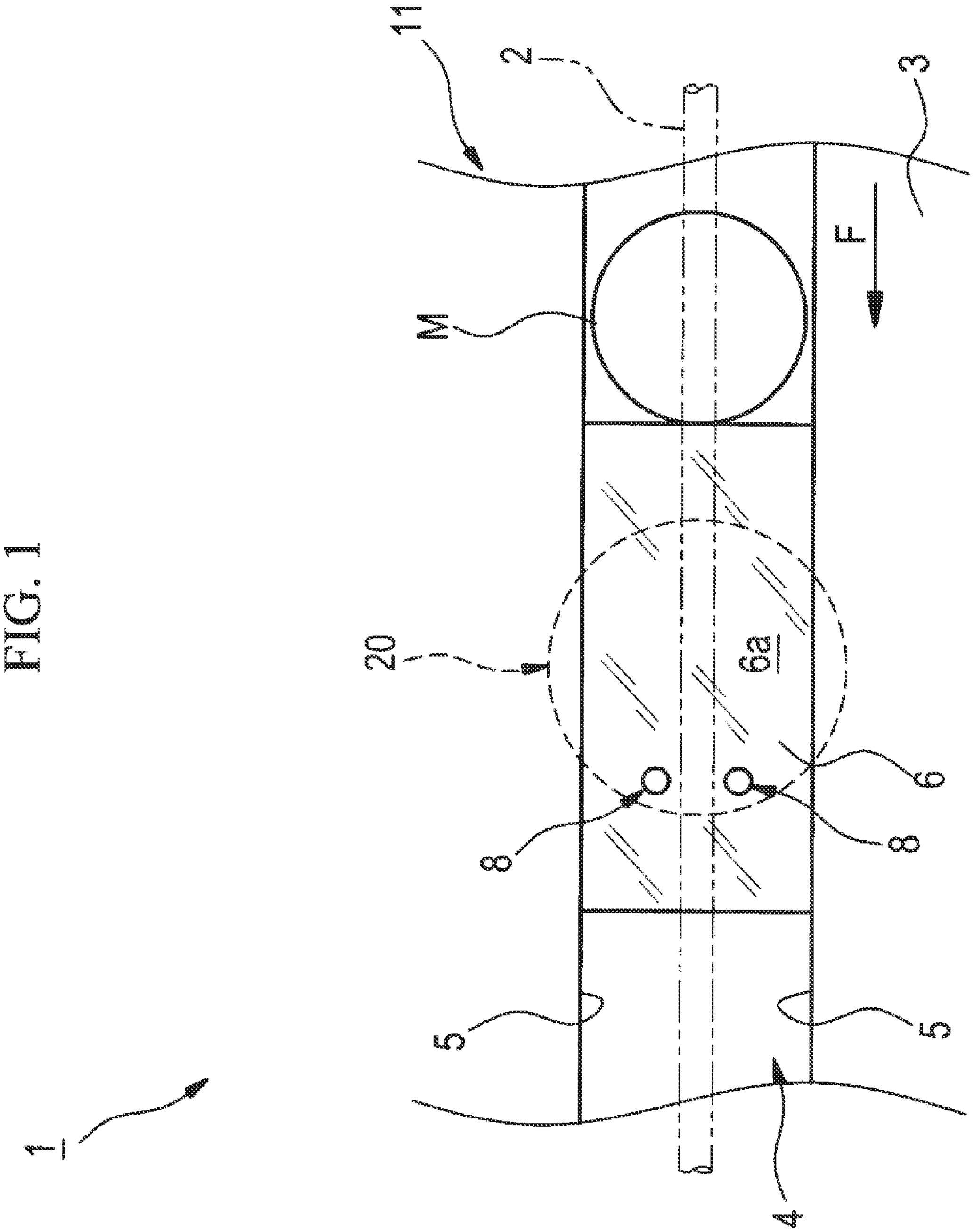
FIG. 1 is a schematic plan view of a transparent unit of a coin discriminating apparatus according to an embodiment of the present invention.

FIG. 1 is a schematic plan view of a transparent unit of a coin discriminating apparatus according to the embodiment of the present invention.

As shown in FIG. 1, the coin discriminating apparatus 1 includes a carrier device 11 that carries a coin M.

The carrier device 11 includes a plate-shaped carrier unit 3, a carrier belt 2 that carries the coin M, and a guide groove 5 formed in the surface of one side of the carrier unit 3. The guide groove 5 guides the coin M that is carried. The internal space of the guide groove 5 in the carrier unit 3 is a coin passage 4 for carrying the coin M.

The carrier belt 2 is an endless belt supported by a driving roller and a backup roller (not shown in the figure). The carrier belt 2 is driven in a direction that is approximately parallel to the direction in which the guide groove 5 extends. The carrier belt 2 carries the coin M in the direction of the arrow F while being pressed against the surface of the carrier unit 3 within the guide groove 5.

The carrier unit 3 has a transparent unit 6 that is formed by a light-transmittable transparent material, such as sapphire glass or an acrylic resin. The transparent unit 6 is a rectangular shape in a state where the carrier unit 3 is viewed in plan view. The transparent unit 6 is exposed within the guide groove 5, and has a supporting surface 6*a* that supports the surface of the coin M that is to be carried. The supporting surface 6*a* of the transparent unit 6 constitutes a portion of the carrier unit 3.

Furthermore, the coin discriminating apparatus 1 includes an imaging unit 20 that images the coin M which passes the transparent unit 6, through the transparent unit 6. The imaging unit 20 has an imaging region that includes at least a portion of the transparent unit 6. The center of the imaging region is approximately set to the center of the supporting surface 6*a* of the transparent unit 6, which is exposed to the guide groove 5. In the imaging region, light is irradiated through the supporting surface 6*a* of the transparent unit 6, and the light that permeates the transparent unit 6 is irradiated onto the surface of the coin M, which passes over the transparent unit 6. The imaging unit 20 mainly receives the reflected light from the surface of the coin M, and produces image data. The specific configuration of the imaging unit 20 is described below.

Figure 2:
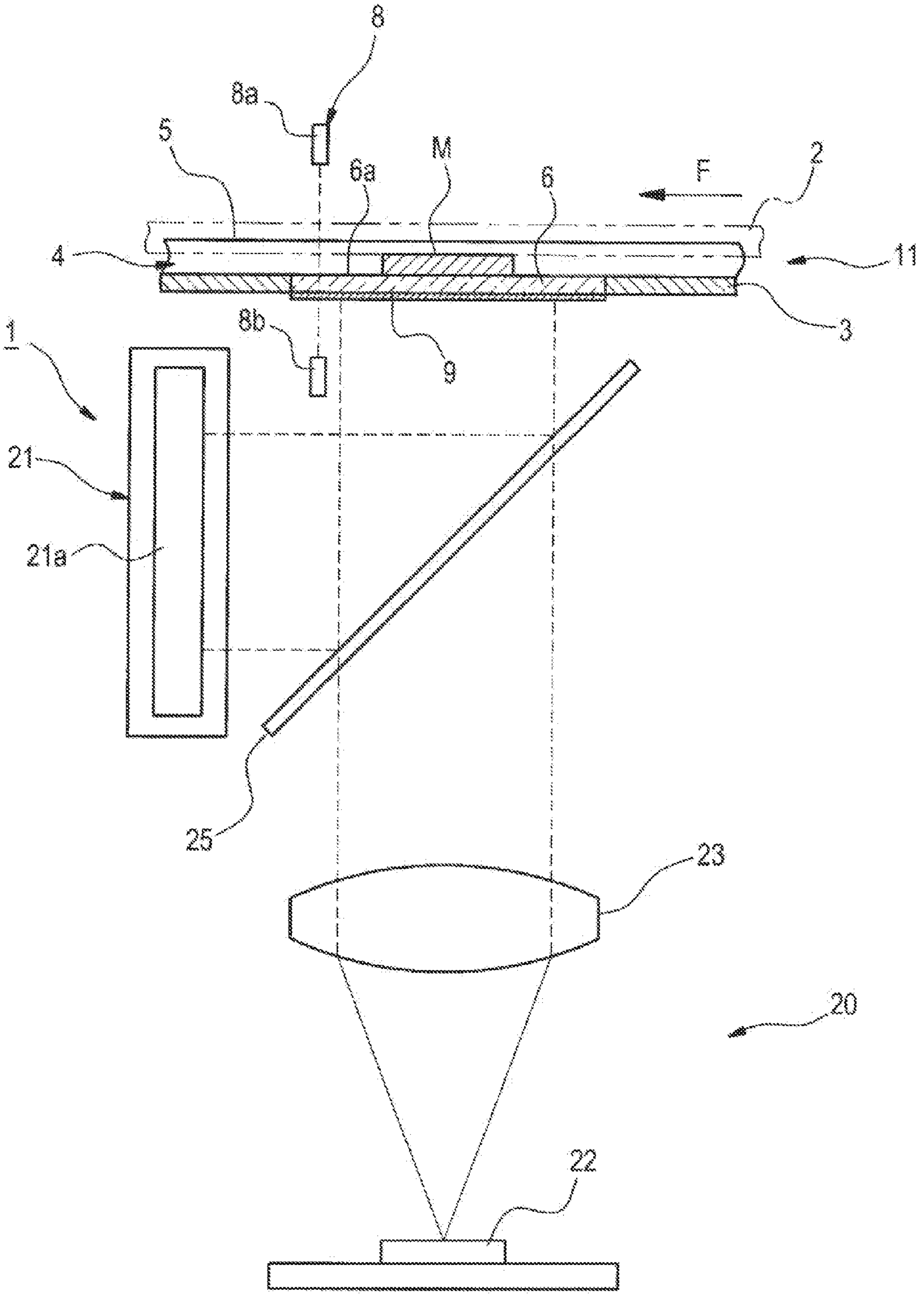
FIG. 2 shows in simple form, a state in which the vicinity of the transparent unit of the coin discriminating apparatus in FIG. 1 is viewed from a side surface.

FIG. 2 shows in simple form, a state in which the vicinity of the transparent unit of the coin discriminating apparatus is viewed from a side surface.

As shown in FIG. 2, the coin discriminating apparatus 1 includes a light irradiation unit 21, an imaging element 22, a lens 23, and a beam splitter 25.

The light irradiation unit 21 includes a surface light source 21*a*. The surface light source 21*a* is arranged in the vicinity of the surface of the carrier unit 3 on the light irradiation side. The surface light source 21*a* has an irradiation surface that irradiates illumination light perpendicularly with respect to the supporting surface 6*a*. The surface light source 21*a* is arranged such that the irradiation surface is approximately perpendicular with respect to the supporting surface 6*a* of the transparent unit 6. As the surface light source 21*a*, for example a white-colored surface light source including a plurality of white-colored LEDs may be used.

The imaging element 22 may be a CCD-type image sensor or a CMOS-type image sensor, that images reflected light in the imaging region. The imaging element 22 produces image data by converting the received reflected light into an electrical signal, and outputs the image data thereof.

The lens 23 has an optical function of collecting the luminous flux of the reflected light from the imaging region, in order to image the reflected light reflected in the imaging region, on the imaging element 22. The lens 23 is arranged such that the optical axis of the lens 23 coincides with the central axis of a circle centered on a central portion of the transparent unit 6. The lens 23 is preferably a lens such as a telecentric lens that has a deep depth of field and a constant magnification throughout its range, and which does not have image distortions attributable to parallax error.

The beam splitter 25 is arranged in a position in which the luminous flux of the illumination light emitted from the light irradiation unit 21 and the luminous flux of the light received by the imaging element 22 intersect, and these luminous fluxes are directed toward the imaging region. As the beam splitter 25, a half mirror that reflects the illumination light emitted from the light irradiation unit 21 onto the imaging region, and further, which transmits the reflected light reflected at the imaging region, may be used.

Furthermore, as shown in FIG. 2, the coin discriminating apparatus 1 includes a timing sensor 8 provided for the transparent unit 6. The timing sensor 8 includes a light emitting element 8*b* and a light receiving element 8*a*. The timing sensor 8 is configured such that the light emitted from the light emitting element 8*b* can be received by the light receiving element 8*a* through the transparent unit 6, and such that a timing signal is output when the light emitted from the light emitting element 8*b* is not received by the light receiving element 8*a*. The timing sensor 8 is arranged in a position in which, when the timing signal is output without the light emitted from the light emitting element 8*b* being received by the light receiving element 8*a* as a result of being interrupted by the coin M being carried over the surface of the transparent unit 6, it is able to detect that the coin M is in front of the imaging point. In FIG. 2, the configuration is such that the timing sensor 8 is provided on the downstream side of the transparent unit 6, however it is not limited to this configuration. The timing sensor 8 may be provided on the upstream side of the transparent unit 6.

An antireflective film 9 is formed on the surface of the transparent unit 6 on the opposite side to the supporting surface 6*a*. The antireflective film 9 has a feature that prevents the occurrence of surface reflections of the illumination light on the surface on the opposite side to the supporting surface 6*a* of the transparent unit 6. The antireflective film 9 is configured by a single-layer or a multi-layer film that is deposited on the surface of the transparent unit 6.

By providing the antireflective film 9, the ratio (dynamic range) between the minimum value and the maximum value of the signal of the reflected light received by the imaging element 22 can be made wider compared to a case where an antireflective film is not provided. Consequently, it is preferable to provide the antireflective film 9.

Next, the control system of the coin discriminating apparatus is described.

Figure 3:
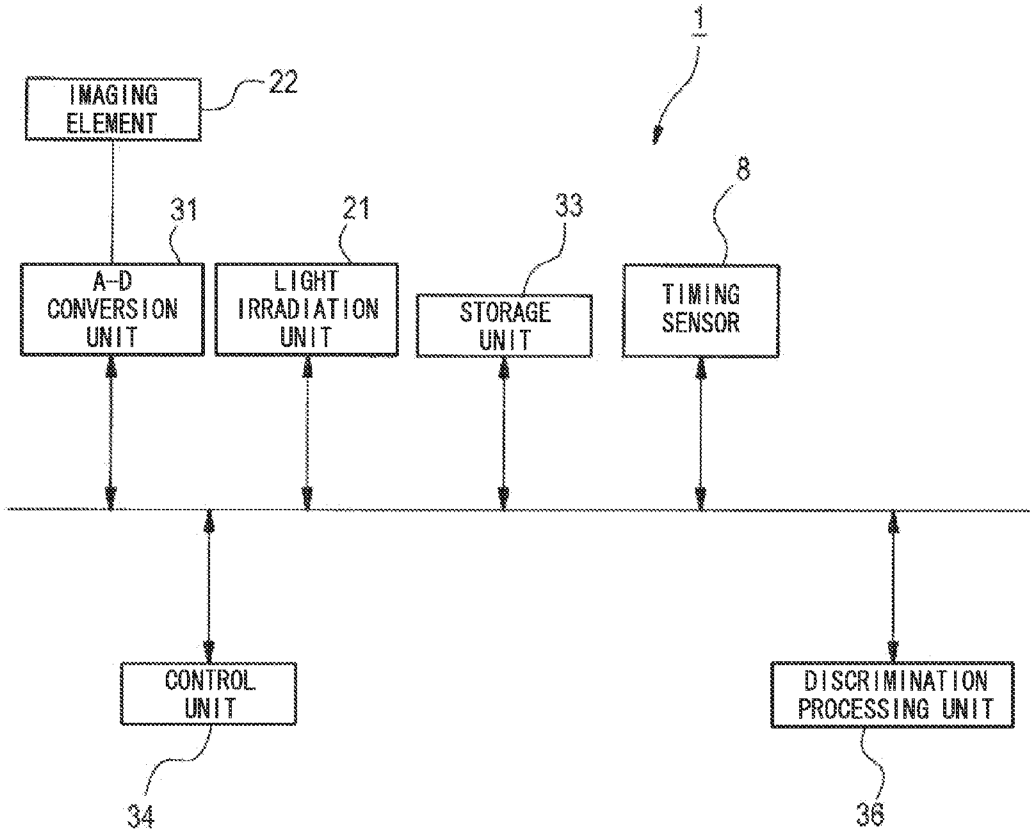
FIG. 3 is a block diagram showing a control system of the coin discriminating apparatus in FIG. 1.

FIG. 3 is a block diagram showing a control system of the coin discriminating apparatus 1 shown in FIG. 1 and FIG. 2. The coin discriminating apparatus 1 includes a control unit 34 that collectively controls the control system.

Furthermore, the coin discriminating apparatus 1 includes an analog-to-digital conversion unit (A-D conversion unit) 31, a storage unit 33, and a discrimination processing unit 36. These processing units are mutually connected and controlled by commands from the control unit 34.

The control unit 34 outputs an irradiation signal to the light irradiation unit 21 synchronous with when the timing signal is input from the timing sensor 8, causing the light irradiation unit 21 to irradiate illumination light. Furthermore, the control unit 34, synchronous with when the timing signal is input, performs reading of the digital data of the reflected light received by the imaging element 22, and instructs generation of the image data.

The analog-to-digital conversion unit 31 converts the analog signal image data input from the imaging element 22, into a digital signal, and outputs the digitized image data.

The storage unit 33 stores the image data. The storage unit 33, in addition to the image data, stores image pattern data that represents the unevenness pattern of each type of coin M in advance. The storage unit 33 reads out the image data and the image pattern data according to the read out control of the control unit 34.

The discrimination processing unit 36 performs discrimination processing of the coin M by utilizing the image data produced by the imaging element 22. In the discrimination process, the discrimination processing unit 36, according to the timing signal of the timing sensor 8 causes the storage unit 33 to store, as the subject image data, the image data which is produced by imaging the imaging region when the coin M is present in the imaging region, and represents the shadows which include the unevenness pattern of the coin surface.

Furthermore, even at times other than at the time of discrimination processing, namely at the time of manufacturing or at the time of a maintenance mode, the coin discriminating apparatus 1 can cause the storage unit 33 to store, as correction image data, the image data produced by imaging the imaging region when a subject is not present in the imaging region. At this time, the control unit 34 outputs an irradiation signal to the light irradiation unit 21 irrespective of the timing signal, causing the light irradiation unit 21 to irradiate illumination light, and the control unit 34 drive controls the imaging element 22, causing the imaging element 22 to receive the reflected light and generate the image data.

At the time of manufacture of the coin discriminating apparatus 1 being completed or at the time of the maintenance mode of the coin discriminating apparatus 1, the discrimination processing unit 36 causes the storage unit 33 to store, as correction image data, the image data produced by imaging the imaging region when a subject, or a reflecting object such as the carrier unit or the carrier belt, is not present in the imaging region.

Furthermore, the discrimination processing unit 36 corrects the subject image data, using the correction image to thereby produce corrected data. Here, the subject image data is data produced by imaging the imaging region when the subject is present in the imaging region. On the other hand, the correction image data is data produced by imaging the imaging region free from a subject, and a reflecting object such as the carrier unit or the carrier belt. The discrimination processing unit 36 then stores the corrected data in the storage unit 33 as discrimination image data. The discrimination processing unit 36 discriminates the coin M represented by the discrimination image data, by comparing the discrimination image data and the image pattern data stored in the storage unit 33.

The coin discriminating apparatus 1 may include a display unit that displays an image based on the subject image data or the discrimination image data.

The coin discriminating apparatus 1, by means of the correction image data, can obtain the level of the reflected light that is reflected solely from the supporting surface 6*a* of the transparent unit 6 in which the coin M is not present. Further, by correcting the subject image data by using this correction image data, the coin discriminating apparatus 1 can obtain, in effect, discrimination image data produced based on the reflected light that is reflected solely from the coin surface, which excludes the reflected light that is reflected by the supporting surface 6*a* of the transparent unit 6. Consequently, the coin discriminating apparatus 1 can more accurately capture the shadows of the unevenness pattern of the coin surface based on the discrimination image data, and can perform the discrimination process with an excellent accuracy. Furthermore, when the coin discriminating apparatus displays an image based on the discrimination image data, on a display unit or an external display device, the displayed image has an excellent visibility because the infiltration of the reflected light from the transparent member surface is suppressed, the peripheral portion of the coin M and the unevenness pattern of the coin surface are clearly displayed.

The coin discriminating apparatus 1 can correct all of the produced subject image data with the correction image data, by means of the discrimination processing unit 36. However, the coin discriminating apparatus 1 may correct the subject image data with the correction image data, only in a case where the correction mode is selected. In this case, at times other than in correction mode, the discrimination process may be performed by directly utilizing the subject image data as the image discrimination data.

Next, an example of a sequence in which the subject image data and the correction image data are produced, and the subject image data is corrected, is described. The coin discriminating apparatus described below has the same configuration as that described in FIGS. 1 to 3, and the same reference symbols are used.

An operation when the coin discriminating apparatus 1 is set to the maintenance mode is described below.

Figure 4:
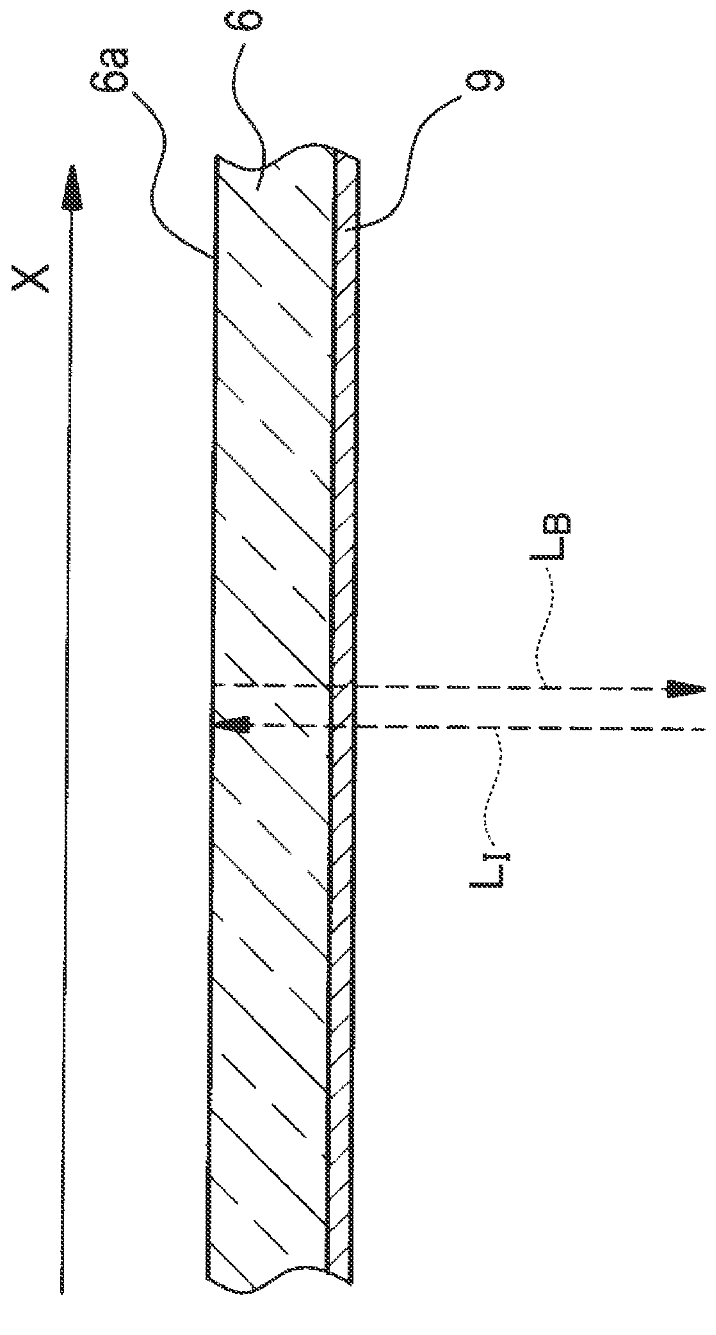
FIG. 4 schematically shows the reflected light from a surface of the transparent unit in FIG. 1 when a subject is not included in an imaging region.

FIG. 4 schematically shows the reflected light from the surface of the transparent unit when the subject, or another reflecting object, is not included in the imaging region. When the maintenance mode is set, the control unit 34 outputs an irradiation signal to the light irradiation unit 21, causing the light irradiation unit 21 to irradiate illumination light $L_I$ toward the imaging region. As shown in FIG. 4, the imaging element 22 then receives the reflected light (reflected light from the interface) $L_B$ reflected from the supporting surface 6*a* of the transparent unit 6. Further, the discrimination processing unit 36 stores the image data produced by the imaging element 22 in the storage unit 33 as correction image data. At this time, in a case where correction image data that is already stored in the storage unit 33 is present, the correction image data stored in the storage unit 33 is updated to the latest correction image data. Here, at the time of manufacturing completion, the same operations are executed as when the maintenance mode is set.

Next, the operation when the coin discriminating apparatus 1 is not set to the maintenance mode, or in other words, when a normal discrimination process is performed, is described.

Figure 5:
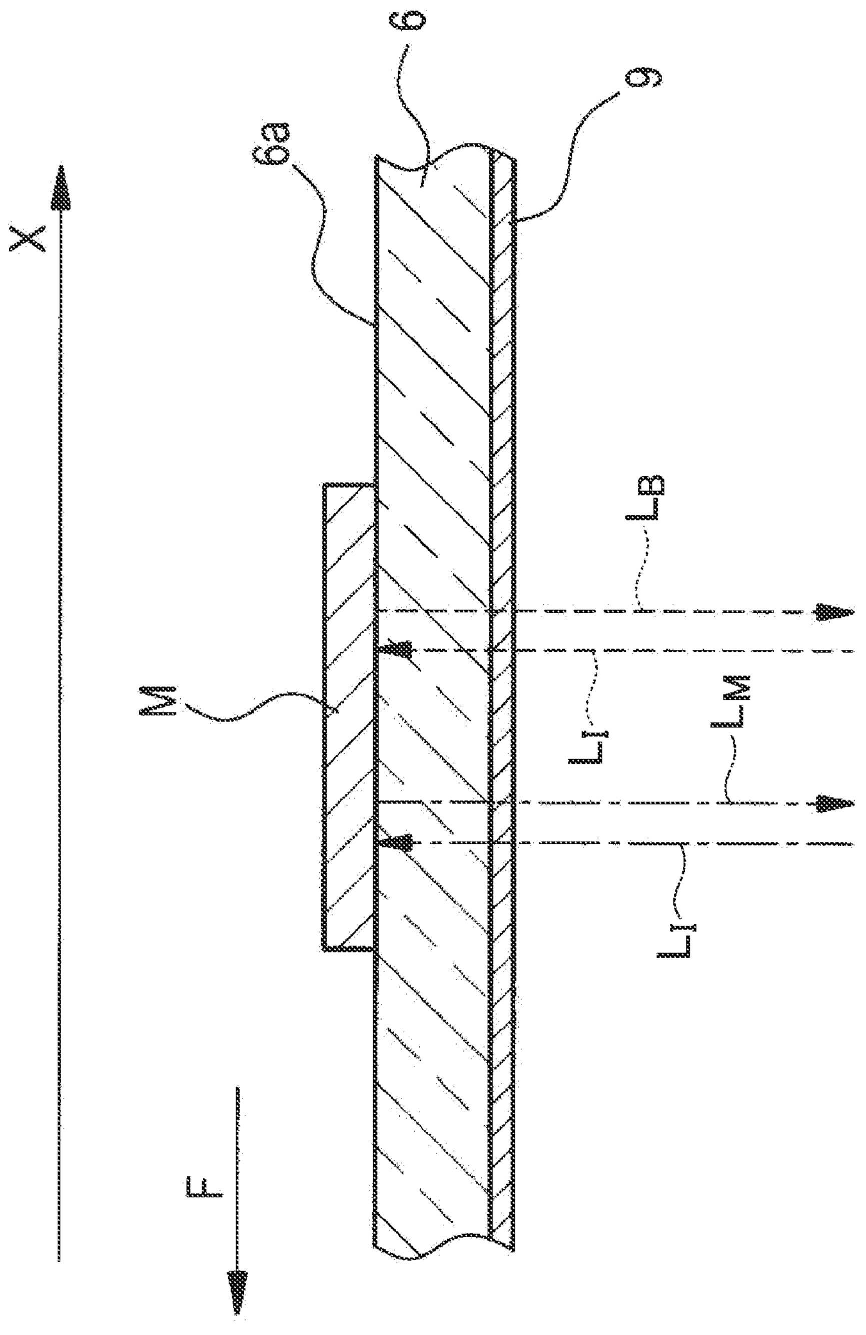
FIG. 5 schematically shows the reflected light from a coin surface and the reflected light from the surface of the transparent unit surface in FIG. 1 when a subject is included in the imaging region.

FIG. 5 schematically shows the reflected light (reflected light from the coin M) $L_M$ from the coin surface, and the reflected light (reflected light from the interface) $L_B$ from the transparent unit surface, when the subject is included in the imaging region. The control unit 34 outputs an irradiation signal to the light irradiation unit 21 according to the timing signal of the timing sensor 8, causing the light irradiation unit 21 to irradiate illumination light onto the coin surface M passing the supporting surface 6*a* of the transparent unit 6, and controls the imaging element 22 to receive the reflected light from the imaging region. Further, the discrimination processing unit 36 stores the image data representing the shadows including the unevenness pattern of the coin surface, in the storage unit 33 as subject image data.

Figure 6:
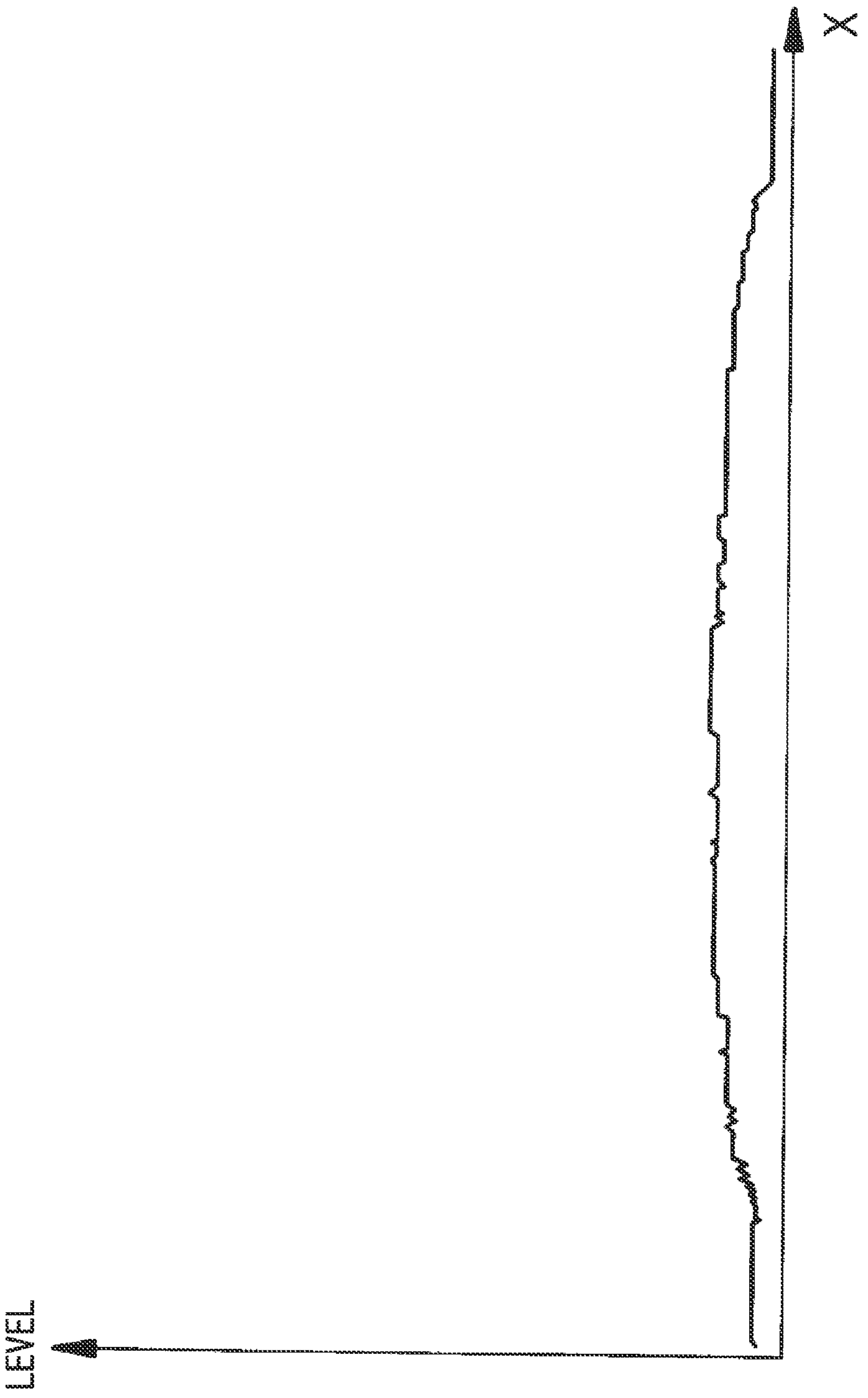
FIG. 6 is a graph showing the waveform of the reflected light level expressed based on the image data produced by the image of FIG. 4.
Figure 7:
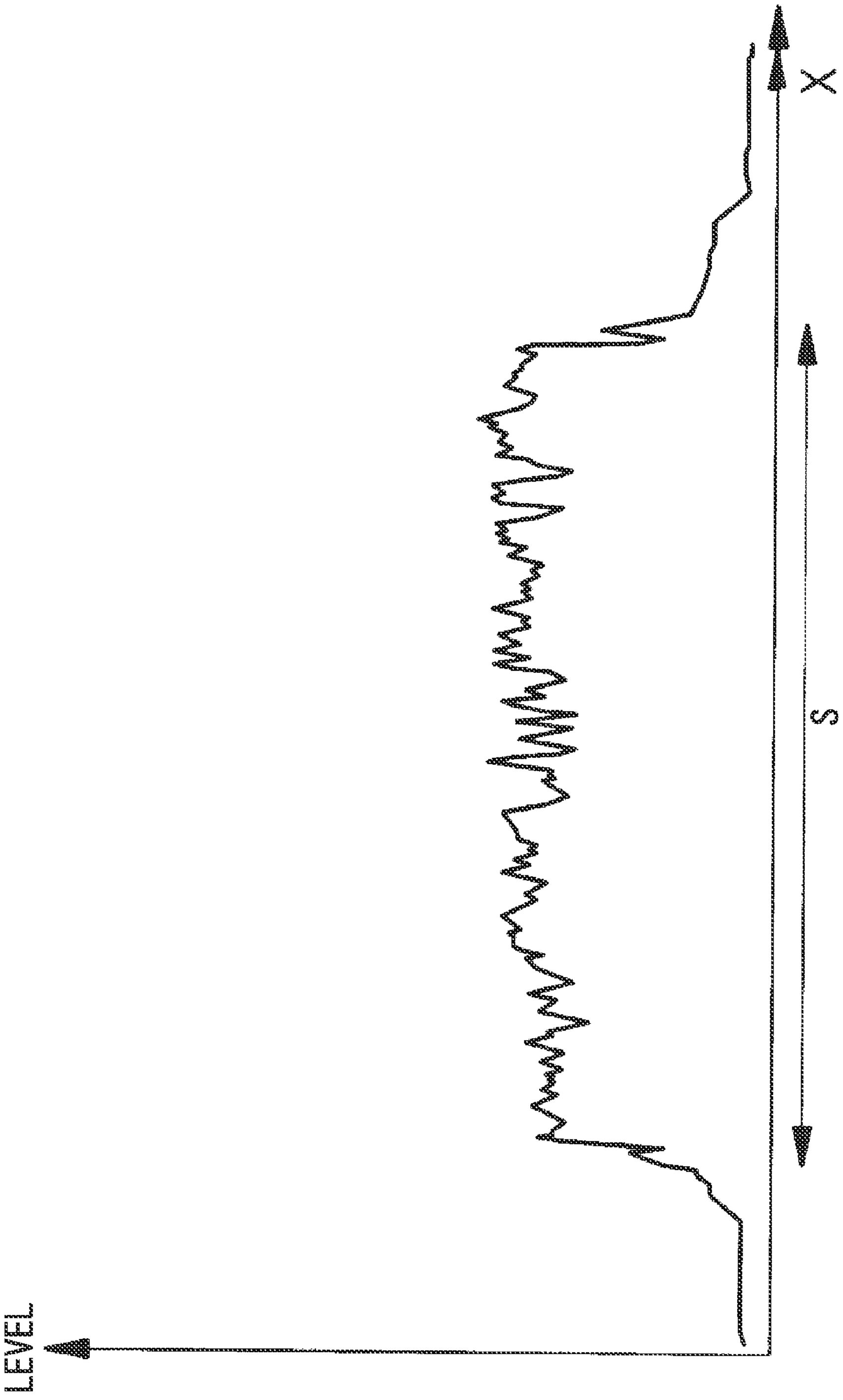
FIG. 7 is a graph showing the waveform of the reflected light level expressed based on the image data produced by the image of FIG. 5.
Figure 8:
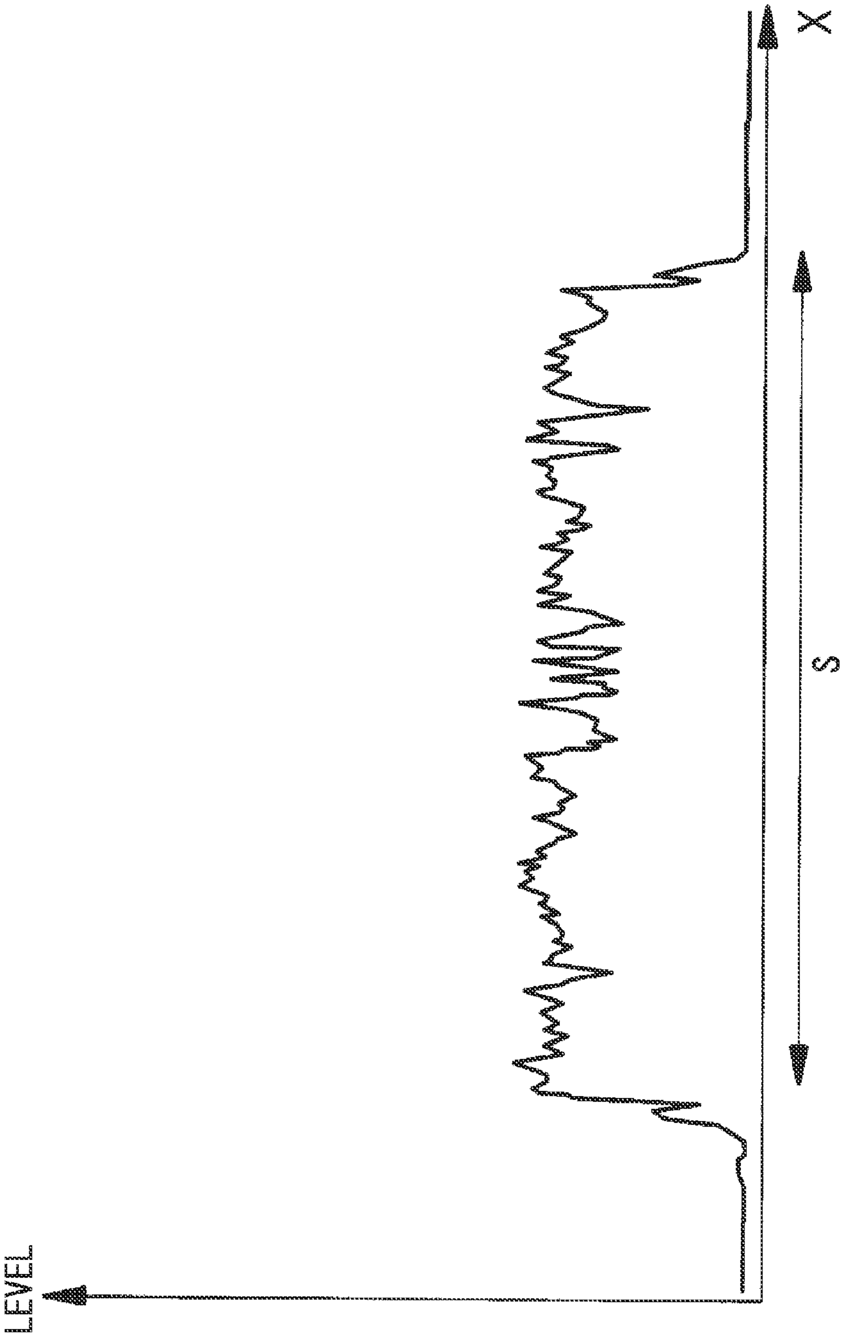
FIG. 8 is a graph showing the waveform of the reflected light level expressed based on corrected image data, in the embodiment of the present invention.

FIG. 6 is a graph showing the waveform of the reflected light level expressed based on the correction image data. Furthermore, FIG. 7 is a graph showing the waveform of the reflected light level expressed based on the subject image data. FIG. 8 is a graph showing the waveform of the reflected light level expressed based on the discrimination image data. In FIGS. 6 to 8, the horizontal axis shows the X-direction position of the imaging region in FIG. 4 and FIG. 5, and the vertical axis shows the level of the reflected light corresponding to the X-direction position. Furthermore, the part indicated by the arrow S in FIG. 7 and FIG. 8 shows the range corresponding to the coin surface with respect to the X-position.

The waveform shown in FIG. 6 shows only the component of the reflected light from the supporting surface 6*a* of the transparent unit 6.

The waveform shown in FIG. 7 shows, in the region corresponding to the coin surface, the component of the reflected light from the coin surface with the component of the reflected light from the supporting surface 6*a* of the transparent unit 6 being superimposed thereon.

The discrimination processing unit 36 corrects the subject image data by subtracting the correction image data from the subject image data. Specifically, the discrimination processing unit 36, based on the correction image data, subtracts the reflected light level from the supporting surface 6*a* of the transparent unit 6, from the reflected light level based on the subject image data. By performing this arithmetic processing, as shown in FIG. 8, the coin discriminating apparatus 1 can obtain the image data including the component of the reflected light from the coin surface, virtually without including the component of the reflected light from the transparent unit 6. The discrimination processing unit 36 outputs this image data as discrimination image data.

In the above coin discriminating apparatus, the configuration is such that the illumination light is irradiated perpendicularly onto the coin surface, which is the imaging subject. However, the arrangement or the configuration of the light irradiation unit is not limited to this. For example, the configuration may be such that the illumination light is irradiated from a diagonal direction onto the coin surface, which is the imaging subject.

Figure 9:
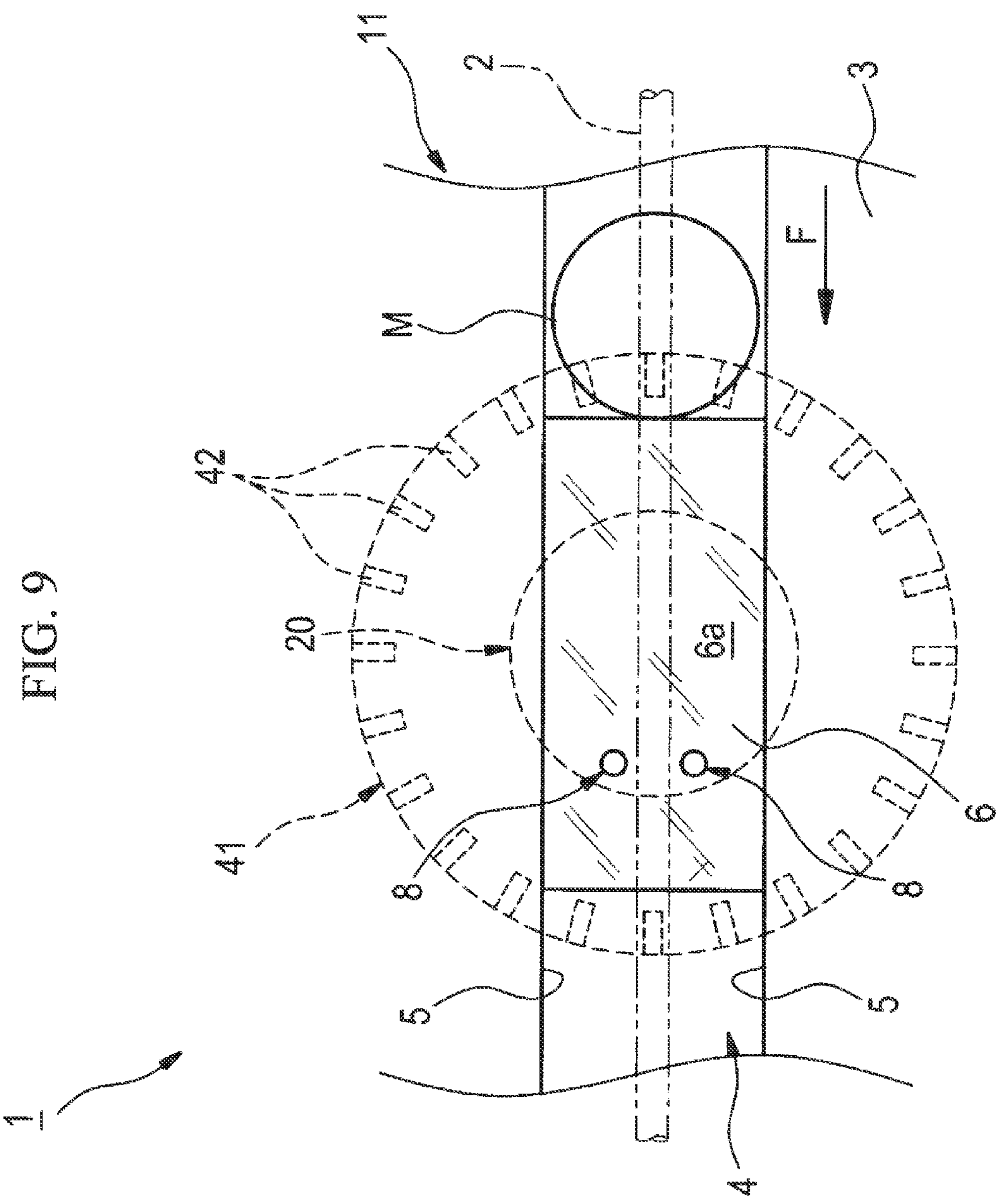
FIG. 9 is a schematic plan view of a transparent unit in another example of the coin discriminating apparatus according to the embodiment of the present invention.

FIG. 9 is a schematic plan view of a transparent unit included in another example of the coin discriminating apparatus according to the embodiment of the present invention.

As shown in FIG. 9, the coin discriminating apparatus 1 includes a circular light irradiation unit 41. The center of the light irradiation unit 41 is set on the central axis passing through the central portion of the transparent unit. The light irradiation unit 41 is configured with a plurality of light emitting elements 42 arranged at approximately equal intervals in the circumferential direction. As the light emitting elements 42, for example LEDs may be used.

Figure 10:
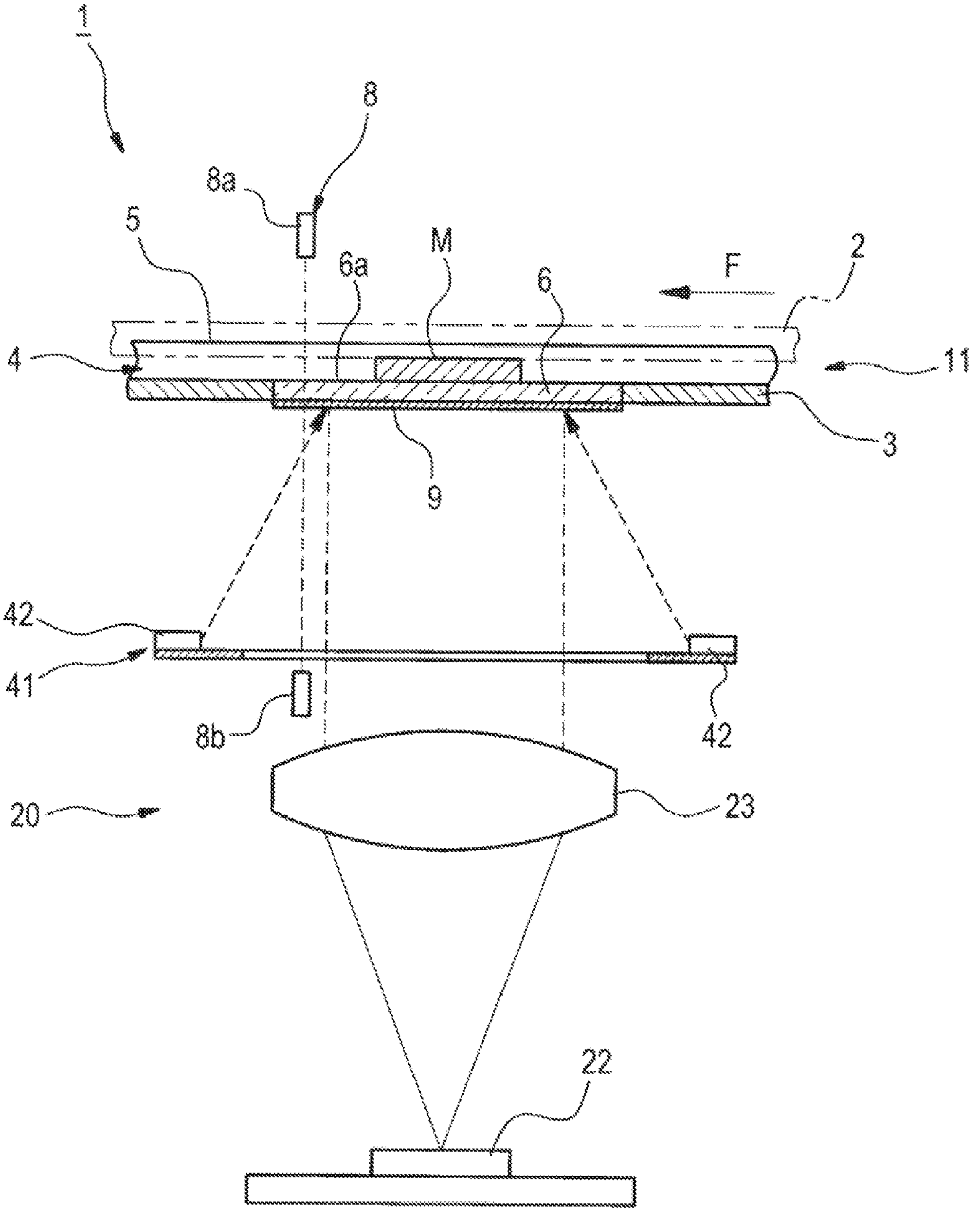
FIG. 10 shows in simple form, a state in which the vicinity of the transparent unit of the coin discriminating apparatus of FIG. 9 is viewed from a side surface.

FIG. 10 shows in simple form, a state in which the vicinity of the transparent unit of the coin discriminating apparatus in FIG. 9 is viewed from a side surface. As shown in FIG. 10, the coin discriminating apparatus 1 includes a light irradiation unit 41, an imaging element 22, and a lens 23.

In the plurality of light emitting elements 42 arranged on the light irradiation unit 41, the luminous flux of the illumination light irradiated from each of the light emitting elements 42 moves in a direction inclined to the transparent unit 6 side with respect to a direction parallel to the supporting surface 6*a* of the transparent unit 6. Further, the illumination light is irradiated diagonally with respect to the coin surface passing the supporting surface 6*a* of the transparent unit 6. The reflected light that is reflected from the coin surface is received by the imaging element 22 via the lens 23.

In the embodiment mentioned above, a configuration of a coin discriminating apparatus that discriminates coins is described as an example. However, with regard to a subject discriminating apparatus of the embodiment of the present invention, the discrimination subject is not limited to coins. It can be applied to the discrimination of objects having an unevenness pattern on the surface, such as coins other than coins used as currency, medals, and other plate-shaped metallic components.

As described above, in the present specification, a subject discriminating apparatus that discriminates a subject having an unevenness pattern on a surface of the subject is described. The subject discriminating apparatus includes: a transparent unit that includes a supporting surface supporting the subject; a light irradiation unit that irradiates illumination light onto the surface of the subject through the transparent unit; an imaging unit that images an imaging region including at least a part of the transparent unit, and generates image data; and a discrimination processing unit that discriminates the subject, using the image data generated by the imaging unit. The discrimination processing unit discriminates the subject based on discrimination image data generated by correcting subject image data using correction image data. The subject image data is generated by imaging the imaging region in a state of the subject presenting in the imaging region. The correction image data is generated by imaging the imaging region free from the subject in the imaging region.

Moreover, the subject discriminating apparatus disclosed in the present specification may further include a storage unit that stores the correction image data. The discrimination processing unit may generate the discrimination image data by correcting the subject image data generated by the imaging unit, using the correction image data stored in the storage unit.

Moreover, in the subject discriminating apparatus disclosed in the present specification, the discrimination processing unit may store the correction image data in the storage unit at a time of manufacturing the subject discriminating apparatus.

Moreover, in the subject discriminating apparatus disclosed in the present specification, the discrimination processing unit may store the correction image data in the storage unit at a time of a maintenance mode of the subject discriminating apparatus.

Moreover, in the subject discriminating apparatus disclosed in the present specification, the discrimination processing unit may generate the discrimination image data by subtracting the correction image data from the subject image data.

Moreover, the subject discriminating apparatus disclosed in the present specification may further include a carrier unit that carries the subject. The support surface of the transparent unit may constitute a part of the carrier unit. The transparent unit may include an antireflective film on a surface on an opposite side to the support surface.

Moreover, in the subject discriminating apparatus disclosed in the present specification, the carrier unit may include a guide groove that guides conveyance of the subject.

Moreover, in the present specification, a coin discriminating apparatus that discriminates a coin having an unevenness pattern on a surface of the coin is described. The coin discriminating apparatus includes: a transparent unit that includes a supporting surface supporting the coin; a light irradiation unit that irradiates illumination light onto the surface of the coin through the transparent unit; an imaging unit that images an imaging region including at least a part of the transparent unit, and generates image data; and a discrimination processing unit that discriminates the coin, using the image data generated by the imaging unit. The discrimination processing unit discriminates the coin based on discrimination image data generated by correcting subject image data using correction image data. The subject image data is generated by imaging the imaging region in a state of the coin presenting in the imaging region. The correction image data is generated by imaging the imaging region free from the coin in the imaging region.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A subject discriminating apparatus that discriminates a subject having an unevenness pattern on a surface of the subject, the apparatus comprising:

a transparent unit that includes a supporting surface supporting the subject;

a light irradiation unit that irradiates illumination light onto the surface of the subject through the transparent unit;

an imaging unit that images an imaging region including at least a part of the transparent unit, and generates image data;

a discrimination processing unit that discriminates the subject, using the image data generated by the imaging unit;

a timing sensor that includes a light emitting element and a light receiving element, the light emitting element emitting light to the transparent unit, the light receiving element receiving light being emitted by the light emitting element and then passing through the transparent unit, the light receiving element outputting a timing signal in response to not receiving light emitted by the light emitting element; and a control unit that receives an input of the timing signal, the control unit causing the light irradiation unit to irradiate the illumination light synchronous with the input of the timing signal, the discrimination processing unit discriminating the subject based on discrimination image data generated by correcting subject image data using correction image data, the subject image data being generated by imaging the imaging region in a state of the subject presenting in the imaging region, and the correction image data being generated by imaging the imaging region free from the subject in the imaging region, the light irradiation unit having a circular shape, a center of the light irradiation unit being set on a central axis passing through a central portion of the transparent unit, the light irradiation unit including a plurality of light emitting elements arranged at approximately equal intervals in a circumferential direction of the light irradiation unit, the plurality of light emitting elements irradiating illumination light so that luminous flux of the illumination light moves in a direction inclined to a side of the transparent unit with respect to a direction parallel to the supporting surface, the light emitting element and the light receiving element being provided within an opening when seen from a direction perpendicular to the supporting surface, the opening being formed by the light irradiation unit.

2. The subject discriminating apparatus according to claim 1, further comprising:

a storage unit that stores the correction image data, wherein the discrimination processing unit generates the discrimination image data by correcting the subject image data generated by the imaging unit, using the correction image data stored in the storage unit.

3. The subject discriminating apparatus according to claim 2, wherein the discrimination processing unit stores the correction image data in the storage unit at a time of manufacturing the subject discriminating apparatus.

4. The subject discriminating apparatus according to claim 2, wherein the discrimination processing unit stores the correction image data in the storage unit at a time of a maintenance mode of the subject discriminating apparatus.

5. The subject discriminating apparatus according to claim 1, wherein the discrimination processing unit generates the discrimination image data by subtracting the correction image data from the subject image data.

6. The subject discriminating apparatus according to claim 1, further comprising:

a carrier unit that carries the subject, wherein the supporting surface of the transparent unit constitutes a part of the carrier unit, and the transparent unit includes an antireflective film on a surface on an opposite side to the supporting surface.

7. The subject discriminating apparatus according to claim 6, wherein the carrier unit includes a guide groove that guides conveyance of the subject.

8. A coin discriminating apparatus that discriminates a coin having an unevenness pattern on a surface of the coin, the apparatus comprising:

a transparent unit that includes a supporting surface supporting the coin;

a light irradiation unit that irradiates illumination light onto the surface of the coin through the transparent unit;

an imaging unit that images an imaging region including at least a part of the transparent unit, and generates image data;

a discrimination processing unit that discriminates the coin, using the image data generated by the imaging unit;

a timing sensor that includes a light emitting element and a light receiving element, the light emitting element emitting light to the transparent unit, the light receiving element receiving light being emitted by the light emitting element and then passing through the transparent unit, the light receiving element outputting a timing signal in response to not receiving light emitted by the light emitting element; and a control unit that receives an input of the timing signal, the control unit causing the light irradiation unit to irradiate the illumination light synchronous with the input of the timing signal, the discrimination processing unit discriminating the coin based on discrimination image data generated by correcting subject image data using correction image data, the subject image data being generated by imaging the imaging region in a state of the coin presenting in the imaging region, and the correction image data being generated by imaging the imaging region free from the coin in the imaging region, the light irradiation unit having a circular shape, a center of the light irradiation unit being set on a central axis passing through a central portion of the transparent unit, the light irradiation unit including a plurality of light emitting elements arranged at approximately equal intervals in a circumferential direction of the light irradiation unit, the plurality of light emitting elements irradiating illumination light so that luminous flux of the illumination light moves in a direction inclined to a side of the transparent unit with respect to a direction parallel to the supporting surface, the light emitting element and the light receiving element being provided within an opening when seen from a direction perpendicular to the supporting surface, the opening being formed by the light irradiation unit.

* * * * *